US008860457B2

(12) United States Patent
Rao et al.

(10) Patent No.: US 8,860,457 B2
(45) Date of Patent: Oct. 14, 2014

(54) PARALLEL CONFIGURATION OF A RECONFIGURABLE INSTRUCTION CELL ARRAY

(71) Applicant: QUALCOMM Incorporated, San Diego, CA (US)

(72) Inventors: Hari Rao, San Diego, CA (US); Sami Khawam, San Diego, CA (US); Ioannis Nousias, San Diego, CA (US); Raghavan Thirumala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/784,827

(22) Filed: Mar. 5, 2013

(65) Prior Publication Data

US 2014/0258678 A1 Sep. 11, 2014

(51) Int. Cl.
*H03K 19/177* (2006.01)
*G06F 15/80* (2006.01)

(52) U.S. Cl.
CPC ..................................... *G06F 15/80* (2013.01)
USPC .................. 326/39; 326/41; 326/47

(58) Field of Classification Search
USPC ............................................... 326/37–41, 47
See application file for complete search history.

(56) References Cited

U.S. PATENT DOCUMENTS

| 5,861,761 | A | * | 1/1999 | Kean ................................ 326/41 |
| 7,103,008 | B2 | | 9/2006 | Greenblat et al. |
| 7,551,508 | B2 | * | 6/2009 | Joshi et al. ..................... 365/226 |
| 7,863,930 | B2 | * | 1/2011 | Nishioka ......................... 326/39 |
| 7,906,987 | B2 | | 3/2011 | Marui |
| 8,295,428 | B2 | | 10/2012 | Hutchings et al. |
| 2002/0114200 | A1 | | 8/2002 | Bal |
| 2007/0279087 | A1 | | 12/2007 | Imafuku |
| 2010/0122105 | A1 | * | 5/2010 | Arslan et al. ................... 713/500 |
| 2012/0303932 | A1 | | 11/2012 | Farabet et al. |

FOREIGN PATENT DOCUMENTS

WO 2011066650 A1 6/2011

OTHER PUBLICATIONS

International Search Report and Written Opinion—PCT/US2014/019049—ISA/EPO—Jun. 23, 2012.
Lu G., et al., "The MorphoSys dynamically reconfigurable system-on-chip", Evolvable Hardware, 1999, Proceedings of the First NASNDOD Workshop on Pasadena, CA, USA Jul. 19-21, 1999, Los Alamitos, CA, USA, IEEE Computer Society, US, Jul. 19, 1999, pp. 152-160, XP010346235, DOI: 10.1109/EH.1999.785447 ISBN: 978-0-7695-0256-4.

* cited by examiner

*Primary Examiner* — Jason M Crawford

(57) ABSTRACT

A reconfigurable instruction cell array (RICA) includes a plurality of switch boxes. Each switch box includes an instruction cell and a switch fabric configurable according to a configuration word stored in a latch array for the switch box. The switch boxes are arranged into broadcast sets such that the latch arrays in each broadcast set receive a configuration word in parallel.

20 Claims, 10 Drawing Sheets

PARALLEL CONFIGURATION OF A RECONFIGURABLE INSTRUCTION CELL ARRAY

TECHNICAL FIELD

This application relates to reconfigurable computing, and more particularly to the parallel configuration or a reconfigurable instruction cell array.

BACKGROUND

Although processor speeds have been progressively increased, the need for increased computing power remains unabated. For example, smart phones now burden their processors with a bewildering variety of tasks. But a single-core processor can only accommodate so many instructions at a given time. Thus, it is now common to provide multi-core or multi-threaded processors that can process sets of instructions in parallel. But such instruction-based architectures must always battle the limits imposed by die space, power consumption, and complexity with regard to decreasing the instruction processing time.

As compared to the use of a programmable processing core, there are many algorithms that can be more efficiently processed in dedicated hardware. For example, image processing involves substantial parallelism and processing of pixels in groups through a pipeline of processing steps. If the algorithm is then mapped to hardware, the implementation takes advantages of this symmetry and parallelism. But designing dedicated hardware is expensive and also cumbersome in that if the algorithm is modified, the dedicated hardware must be redesigned.

To provide an efficient compromise between instruction-based architectures and dedicated hardware approaches, a reconfigurable instruction cell array (RICA) architecture has been developed. FIG. 1A illustrates an example RICA system 50 having a reconfigurable core 1. In RICA 50, a plurality of instruction cells 2 such as adders (ADD), multipliers (MUL), registers (REG), logic operation shifters (SHIFT), dividers (DIV), data comparators (COMP), logic gates (LOGIC), and logic jump cells (JUMP) are interconnected through a programmable switching fabric 4. The configuration of instruction cells 2 with regard to the logical function or instruction they implement can be reprogrammed as necessary to implement a given algorithm or function. Switching fabric 4 would be reprogrammed accordingly as well. Instruction cells 2 include memory interface cells 12 that interface data for remaining ones of the instructions cells 2 as retrieved or loaded into a data memory 8. The resulting processing by instruction cells 2 occurs according to configuration instructions 10 obtained from a configuration RAM 6. A decode module 11 decodes instructions 10 to not only get the configuration data for instructions cells 2 but also for switching fabric 4. RICA 50 interfaces with external systems through I/O ports 16 and specialized instructions cell registers 14. Additional features shown in FIG. 1A are described in U.S. Patent Publication No. 2010/0122105, filed Apr. 28, 2006, the contents of which are hereby incorporated by reference in their entirety.

It is conventional to arrange the instruction cells in a reconfigurable array by rows and columns. Each instruction cell, any associated register, and an associated input and output switching fabric for the instruction cell may be considered to reside within a switching box. FIG. 1B shows an example array of switch boxes arranged in rows and columns. A datapath formed between selected switch boxes is carried on selected channels from a plurality of channels. The channels are also arranged in rows and columns matching the rows and columns for the switch boxes. Each channel has a certain width in bits. The row directions may be considered to run east and west whereas the column directions run north and south. A datapath beginning in an instruction cell in an initial switch box 100 routes on an output channel 101 in an east row direction. The routing for the datapath from subsequent switch boxes is in the appropriate east/west row direction or north/south column direction such that a final switch box 105 at some selected row and column position is reached. In this example data path, two instruction cells are configured as arithmetic logic units (ALUs) 110. The instruction cells for the remaining switch boxes are not shown for illustration clarity. Each switch box includes two switch matrices or fabrics: an input switch fabric to select for channel inputs to its instruction cell and also an output switch fabric to select for the channel outputs from the switch box.

In contrast to an instruction cell, the logic block in a field programmable gate array (FPGA) uses lookup tables (LUTs). For example, suppose one needs an AND gate in the logic operations carried out in a configured FPGA. A corresponding LUT would be programmed with the truth table for the AND gate logical function. But an instruction cell is much "coarser-grained" in that it contains dedicated logic gates. For example, an ALU instruction cell would include assorted dedicated logic gates. It is the function of the ALU instruction cell that is configurable—its primitive logic gates are dedicated gates and thus are non-configurable. For example, a conventional CMOS inverter is one type of dedicated logic gate. There is nothing configurable about such an inverter, it needs no configuration bits. But the instantiation of an inverter function in a FPGA programmable logic block is instead performed by a corresponding programming of a LUT's truth table. Thus, as used herein, the term "instruction cell" refers to a configurable logic element that comprises dedicated logic gates.

An ALU instruction cell performs its logical functions on one or more operands. An operand in this context is a received channel input. Depending upon its configuration bits, an ALU instruction cell is configured to perform corresponding logical operations. For example, a first switch box may include an ALU instruction cell configured to add two operands corresponding to two channel inputs. But the same ALU instruction cell may later be updated to subtract the two operands. The operands that result from the logical operation within an instruction cell may be required in another instruction cell. Thus, the output switch fabric in the first switch box may be configured to drive the resulting operands out of the first switch box through corresponding channel outputs. In contrast, an FPGA's LUTs produce a bit, they do not generate words. So the switch fabric in an FPGA is fundamentally different from the switch fabrics in a RICA in that an FPGA's switch fabric is configured to route the bits from the FPGA's LUTs. In contrast, the routing between switch boxes in a RICA is configured to route words as both input channels and output channels. For example, a switch box array maybe configured to route 20 channels. Switch boxes in such an embodiment may thus receive 20 input channels from all four directions and drive 20 output channels in the four directions.

Note the advantages of a RICA: since the instruction cells comprise dedicated logic gates, the necessary amount of configuration data is substantially less than the configuration data for a comparable FPGA. The switch boxes may thus be readily reconfigured over a relatively brief delay such that the reconfiguration is effectively real-time to a companion processor. In contrast, the massive amount of configuration data for an FPGA requires considerable delay for its loading into the FPGA. A RICA also has processing speed advantages as compared to software-based implementations in a traditional processor. For example, an algorithm such as image processing that involves processing multiple pixels through a pipelined processing scheme can be mapped to instruction cells in a manner that emulates a dedicated hardware approach. But there is no need to design dedicated hardware. Instead one can merely configure the instruction cells and switching fabrics as necessary. Thus, if an algorithm must be redesigned, there is no need for hardware redesign but instead a user may merely change the configuration data. This is quite advantageous over traditional instruction-based computing approaches.

Although a RICA thus offers robust advantages, challenges remain in its implementation. For example a number of configuration bits are required for configurable elements within each switch box such as for the configuration of the instruction cell and switching fabrics. Each switching box thus requires storage elements for storing its configuration bits. In one example embodiment, an array of twenty rows and twenty columns (resulting in 400 switch boxes) requires 77 kilobits for its configuration. The circuitry for the loading of so many configuration bits consumes valuable die space and power. In addition, a RICA requires a minimum latency for the loading of the configuration bits. In that regard, an instruction cell is not statically programmed in a RICA—for example, an instruction cell can be reconfigured several times during normal operation. It may not need such frequent reprogramming but the capability should be provided. Since other systems such a microprocessor may be interfacing with a RICA, the latency of the reconfiguration must be minimized to prevent stalls.

Accordingly, there is a need in the art for area-efficient and low-latency configuration schemes for reconfigurable instruction cell arrays.

SUMMARY

A reconfigurable instruction cell array (RICA) includes a plurality of switch boxes. Each switch box includes an instruction cell and a switch fabric configurable according to a configuration word stored in a latch array for the switch box. The switch boxes are arranged into broadcast sets such that the latch arrays in each broadcast set receive a configuration word in parallel. As compared to the uses of flip-flops to store the configuration words, the necessary die space for the disclosed RICAs is thus reduced substantially.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
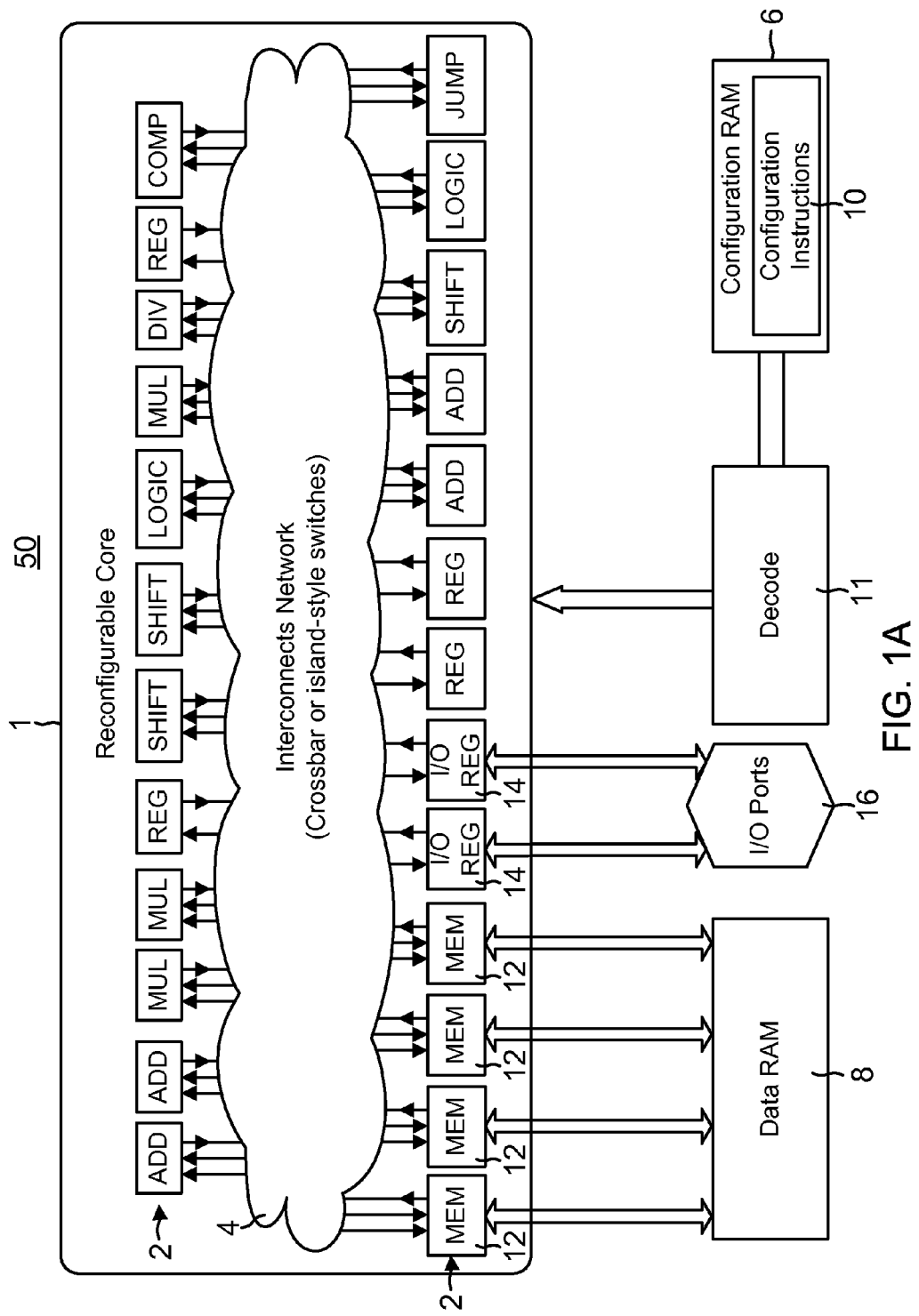
FIG. 1A is a block diagram for an example reconfigurable instruction cell array (RICA).
Figure 1B:
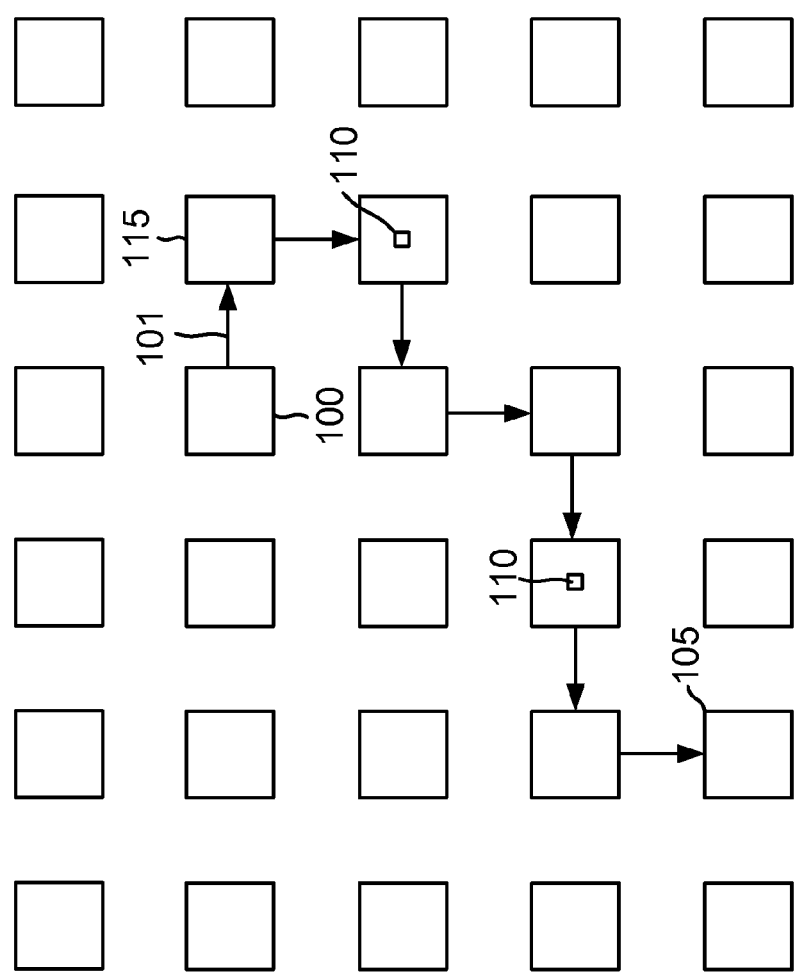
FIG. 1B is a block diagram for an array of switch boxes in the RICA of FIG. 1A.

A reconfigurable instruction cell array (RICA) is provided in which the configuration data is broadcast in parallel to sets of switch boxes. To conserve die space, the configuration data within the switch boxes is stored in latches. As compared to the uses of flip-flops, the necessary die space is thus reduced substantially.

The configuration data to configure the instruction cell and input and output switch fabric in a switch box may be considered to form a configuration word comprising a plurality of configuration bits ranging from a first configuration bit to a last configuration bit. The input and output switch fabric for each switch box are referred to herein collectively as a single switch fabric. Each switch box thus includes a latch array having a plurality of latches corresponding to the plurality of configuration bits for switch box's configuration word. For example, a first latch in a latch array is configured to store a corresponding first configuration bit of a configuration word. Similarly, a second latch in the latch array is configured to store a corresponding second configuration bit for the configuration word and so on such that a final latch in the latch array is configured to store a corresponding final configuration bit for the configuration word. Each switch box's latch array stores the corresponding configuration word for that switch box.

In one RICA embodiment, each switch box not only stores a current-state configuration word for its instruction cell and switch fabrics but also stores a next-state configuration word. Each switch box would thus have a current-state latch array for storing the current-state configuration word as well as a next-state latch array for storing the next-state configuration word. The switch boxes respond to an update signal by loading the next-state configuration word from its next-state latch array into the current-state latch array. The parallel broadcasting architecture is described herein with regard to the loading of the next-state configuration words into the next-state latch arrays. However, the loading scheme disclosed herein is also widely applicable to systems that load only current configuration words. In that regard, the next-state latch arrays disclosed herein are simply referred to as "latch arrays" for brevity unless otherwise required.

The array of switch boxes may be arranged into rows and columns. In that regard, what is a "row" versus what is a "column" is simply a matter of perspective. Thus, the terms row and column are used herein without loss of generality. To enable the advantageous parallel broadcasting of configuration words described herein, the latch arrays in a broadcast set of switch boxes all have their data input terminals driven by a corresponding configuration bus. For example, a broadcast set may comprise a consecutive series of switch boxes in a column of the array. The corresponding configuration bus would thus couple to this consecutive series of switch boxes.

Each configuration bus comprises a plurality of configuration bit conductors corresponding to the plurality of configuration bits. Thus, just like the latches, a first one of the configuration bit conductors corresponds to the first configuration bit for a configuration word, a second one of the configuration bit conductors corresponds to the second configuration bit for the configuration word, and so on. In that regard, the plurality of configuration bit conductors also corresponds to the plurality of latches in each latch array in the broadcast set. The latches in a broadcast set for a given configuration bit have their data input terminals coupled in parallel to the corresponding configuration bit conductor. Thus, the first configuration bit conductor for a broadcast set's configuration bus couples to the data input terminal for each first latch in the broadcast set's latch arrays. Similarly, the second bus conductor in the broadcast set's configuration bus couples to the data input terminal for each second latch in the broadcast set's latch arrays, and so on.

Given this coupling of the configuration bus to the broadcast set's latch arrays, a configuration word driven onto the configuration bus results in each latch in the broadcast set's latch arrays receiving at its data input terminal the corresponding configuration bit in the configuration word. In this fashion, the configuration bits are broadcast down their respective configuration bit conductors to the data input terminals for the corresponding latches.

Figure 2:
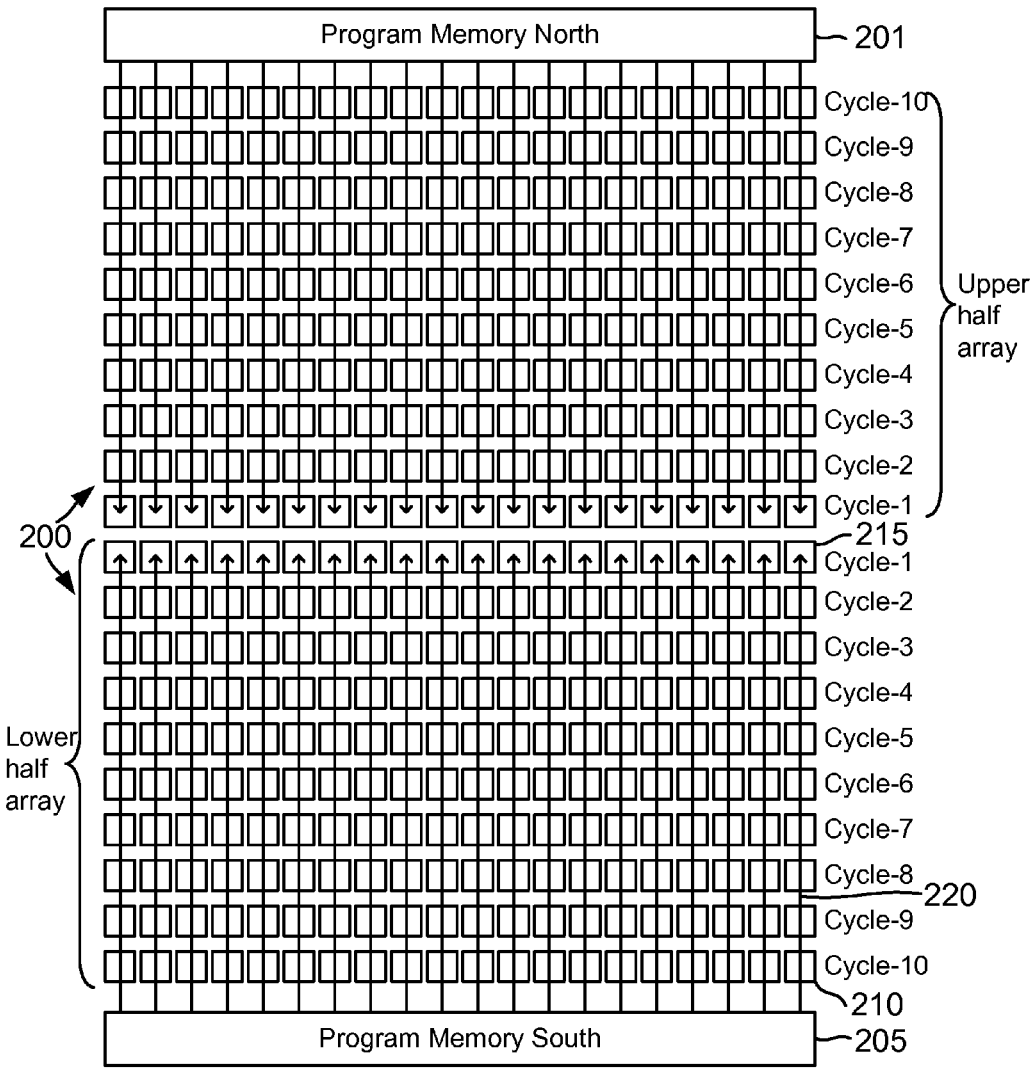
FIG. 2 shows an array of switch boxes arranged into broadcast sets such that each broadcast set's switch boxes are configured to receive a configuration word in parallel.

FIG. 2 illustrates an embodiment in which a RICA's switch box array 200 comprises twenty rows and twenty columns of switch boxes. Each column is split in half with regard to the parallel broadcasting of the configuration data such that switch box array 200 comprises an upper half array and a lower half array. Each switch box broadcast set thus comprises a half column in one of the half arrays. For example, one broadcast set in the lower half array extends from a switch box 210 to a switch box 215. A program or configuration memory for each half array drives the half array's configuration buses 220. There is thus a program memory north 201 for the upper half array and a program memory south 205 for the lower half array. Each program memory 201 and 205 is configured to drive configuration words into the configuration busses 220 for its corresponding half array. For example, memory south 205 is configured to drive configuration words into the broadcast set extending from switch box 210 to switch box 215 through a corresponding configuration bus 220. In one embodiment, each configuration word width is 192 bits. The configuration of a row of twenty switch boxes in such an embodiment thus requires 20*192 bits, which equals 3840 bits. Since there are twenty rows in array 200, the configuration data for array 200 would then comprise 20*3840 bits, which equals approximately 77 kbits.

In an alternative embodiment, a single configuration memory could store all the configuration words. Each broadcast set would extend across a corresponding full column of array 200. But as will be explained further herein, the loading time for the configuration process is halved in embodiments in which the array is arranged into half arrays each having their own broadcast sets such in array 200.

Figure 3:
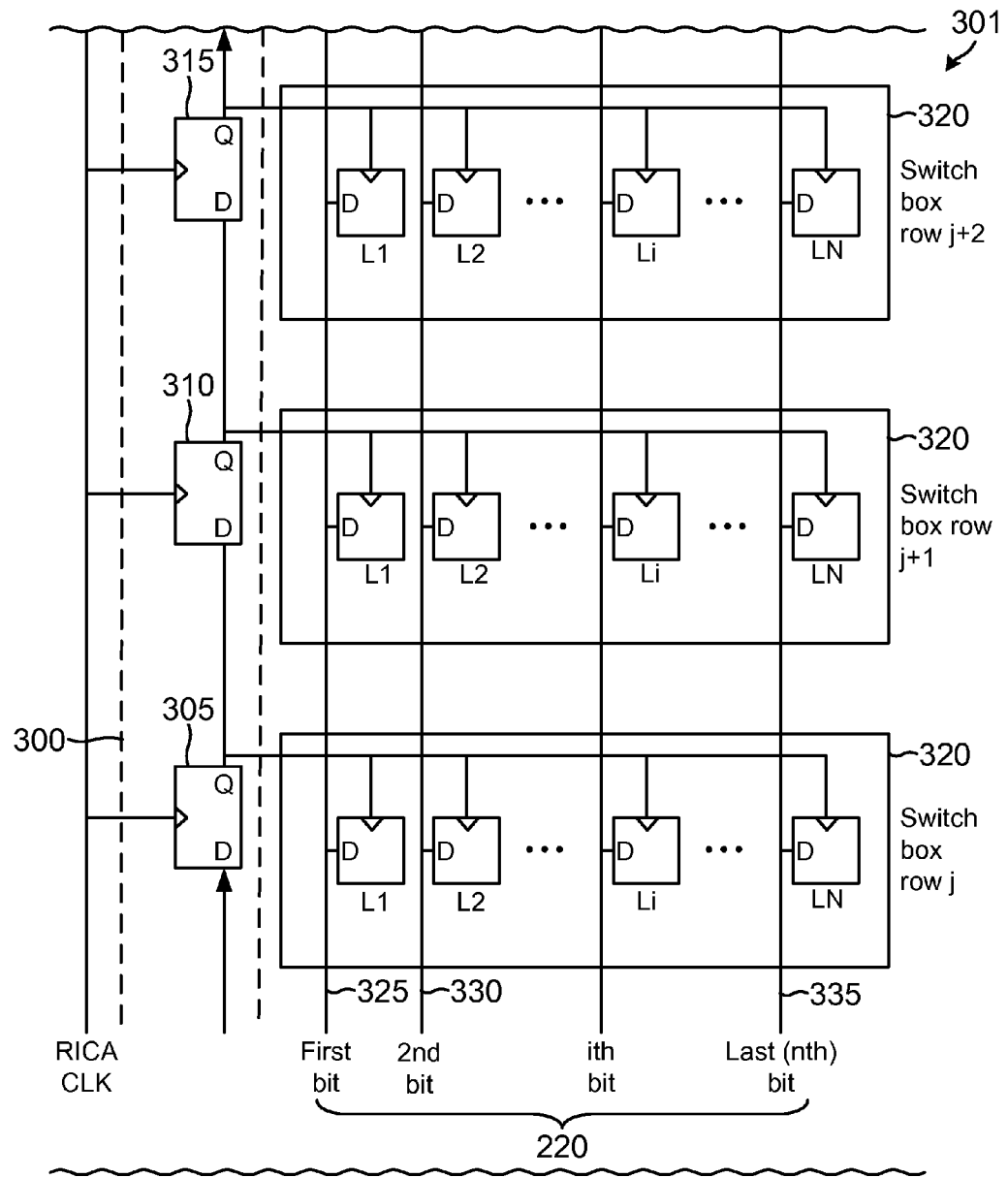
FIG. 3 is a high-level schematic for a plurality of latch arrays in a portion of a broadcast set, wherein the latch arrays are configured to be closed responsive to a latching word shifted through a shift register.

As discussed above, the latches in each switch box may be considered to form a latch array such that each switch box has its own corresponding latch array. Since the latch arrays in each broadcast set receive a configuration word in parallel, a given latch array should be closed after it has latched the appropriate configuration word. In FIG. 3, an addressing circuit 300 controls whether the latches in latch arrays 320 for a broadcast set 301 are closed or transparent. For illustration clarity, only a portion of the switch boxes for broadcast set 301 are shown in FIG. 3. For further illustration clarity, each switch box in broadcast set 301 is represented only by its latch array 320. Each latch array 320 stores the configuration word for the configuration of its corresponding switch box. In broadcast set 301, a first latch array 320 is in a jth row of array 200, where j represents some arbitrary switch box row. Similarly, a second latch array 320 is in a neighboring (j+1)th row of array 200. Finally, a third latch array 320 is in a (j+2)th row of array 200. The switch boxes in broadcast set 301 are all in the same column as discussed with regard to switch box array 200.

Each latch array 320 has n latches to store a configuration word having a width of n bits, n representing some arbitrary bit width (e.g., the previous example of 192 bits). Each latch is designated by its corresponding configuration bit. Thus, a first latch L1 in each latch array 320 is configured to store the first configuration bit for the corresponding configuration word. Similarly, a second latch L2 is configured to store the second configuration bit for the corresponding configuration word, and so on such that a final latch Ln is configured to store the final nth configuration bit for the corresponding configuration word. In the 192-bit wide embodiment, n would be 192. In this fashion, an ith configuration bit is stored by a corresponding latch Li, where i is an arbitrary integer within the configuration bit width.

Configuration bus 220 includes the plurality of configuration bit conductors corresponding to the plurality of configuration bits in each configuration word. An initial configuration bit conductor 325 is configured to couple the first configuration bit to a data input terminal for each latch L1 in broadcast set 301. Similarly, a second configuration bit conductor 330 is configured to couple the second configuration bit to a data input terminal for each latch L2 in the broadcast set, and so on such that a final configuration bit conductor 335 is configured to couple the final configuration bit to a data input terminal for each latch Ln in the broadcast set. In this fashion, an ith configuration bit conductor for the ith configuration bit couples to all the Li latches in the broadcast set, where i is an arbitrary integer within the configuration word width ranging from 1 to n.

In one embodiment, all the latches in a broadcast set may be configured to be transparent in a default (non-addressed) state. Should a configuration word be retrieved from a memory such as memory 201 or 205 and driven into configuration bus 220, it would then be latched within all latch arrays 320 in broadcast set 301. In a default-open embodiment, addressing circuit 300 controls whether the latches in a given latch array 320 are closed from the default transparent state. In broadcast set 301, addressing circuit 300 comprises a shift register 300 formed from a corresponding chain of flip-flops. Referring again to array 200, the latch arrays in each row of the switch boxes may be closed by a corresponding flip-flop in shift register 300. Thus, as shown in FIG. 3, a flip-flop 305 controls whether the latch arrays 320 in the jth switch box row are closed. Similarly, flip-flops 310 and 315 control the (j+1)th and (j+2)th switch box rows, respectively. Each half array of switch boxes may have a corresponding shift register 300. Alternatively, a single shift register 300 may be configured to address both half arrays.

Each flip-flop in shift register 300 may be clocked by a RICA system clock (CLK). In a default-transparent embodiment, each flip-flop in shift register 300 may be reset initially. A Q output from each flip-flop functions as a strobe signal that drives the clock inputs or enable inputs for the latches in the corresponding row of switch boxes. For example, a Q output from flip-flop 305 drives the clock input for the latches in each latch array 320 in the jth row of switch boxes. As discussed above, FIG. 3 shows only a portion of a single broadcast set 301. Thus, the latch arrays for the remaining switch boxes in the jth, (j+1)th, and (j+2)th rows of FIG. 3 are not shown for illustration clarity. Each latch may be level-sensitive low in one embodiment. Thus, such latches are closed when their clock inputs are driven high. Referring again to array 200, there are 10 rows in each half array. Thus, shift register 300 would initially hold 10 zeroes for a transparent-low embodiment. During the configuration process, a 10-bit wide latching word of all logical ones may then be successively shifted into shift register 300 responsive to cycles of the RICA clock. In an initial RICA clock cycle, an initial row of switch boxes are thus controlled such that the latches in this row are closed from the default-open state. Because this is an initial RICA clock cycle, the corresponding switch box row in each half array is designated as Cycle-1 in FIG. 2. With regard to the row order of broadcast set 301, the Cycle-1 row is thus the first row in each half array. As successive logical one bit values of the latching word are shifted into shift register 300, the latches in the corresponding switch box row are closed. Thus, after ten RICA clock cycles, the latches in a Cycle-10 switch box row are closed to complete the loading of the configuration words for a given broadcast set. In contrast, for an embodiment in which array 200 is not split into half arrays such that each broadcast set 301 extends across a full column (instead of a half column), the loading of the configuration words would require twenty clock cycles. The splitting of array 200 such that each broadcast set 301 extends across just a half column thus lowers the necessary loading time by one-half. For example, should each RICA clock cycle be 3 nanoseconds, the configuration of array 200 would then require just 30 nanoseconds. In contrast, a comparable FPGA would require considerably longer for a reconfiguration.

The number of configuration words retrieved from memories 201 and 205 in any given RICA clock cycle during the loading process depends upon the number of switch box columns (and hence the number of broadcast sets per half array). If there are twenty columns as shown for array 200, then twenty configuration words are driven into the twenty corresponding configuration buses 220 accordingly.

Figure 4A:
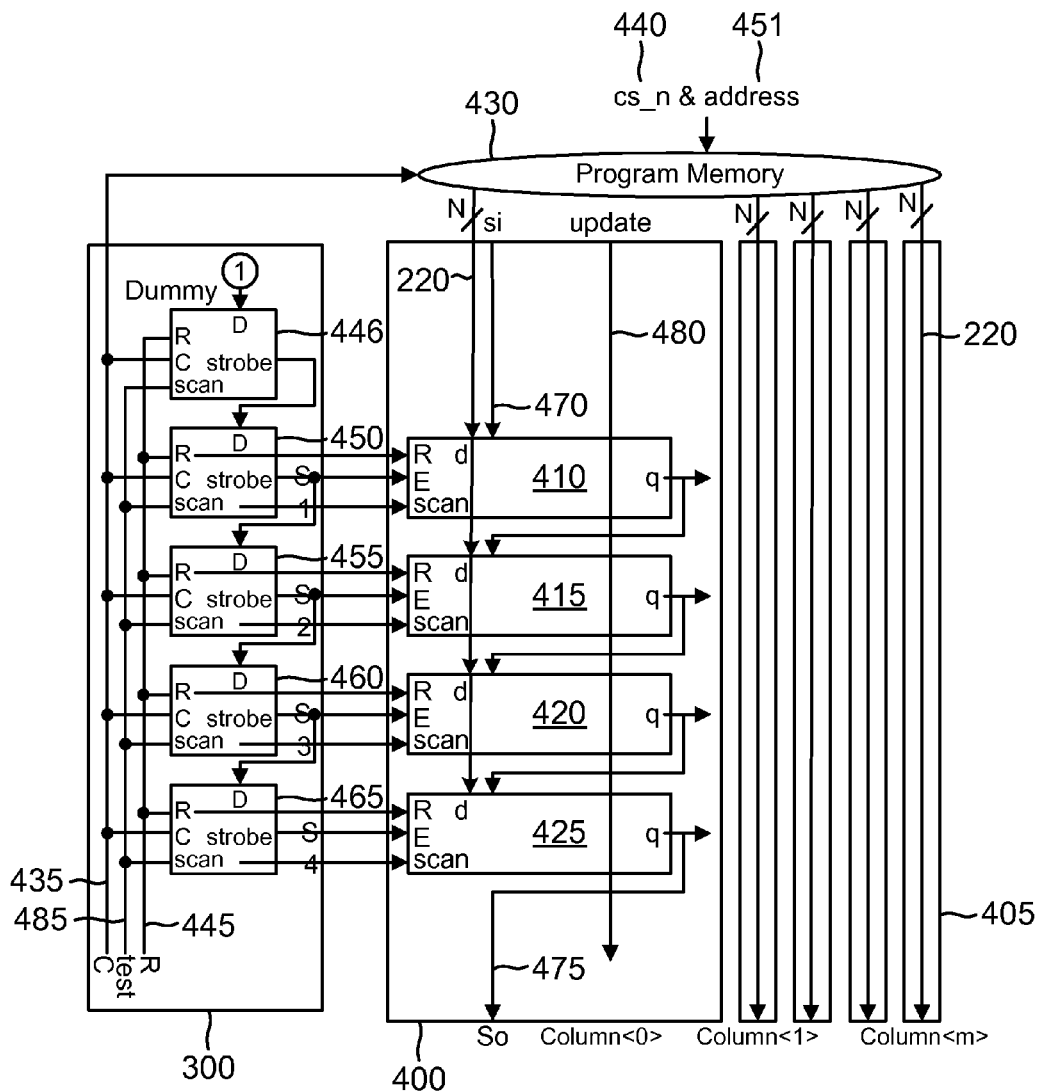
FIG. 4A is a more detailed schematic for a RICA having an array of switch boxes arranged into broadcast sets such that each broadcast set's switch boxes are configured to receive a configuration word in parallel.
Figure 4B:
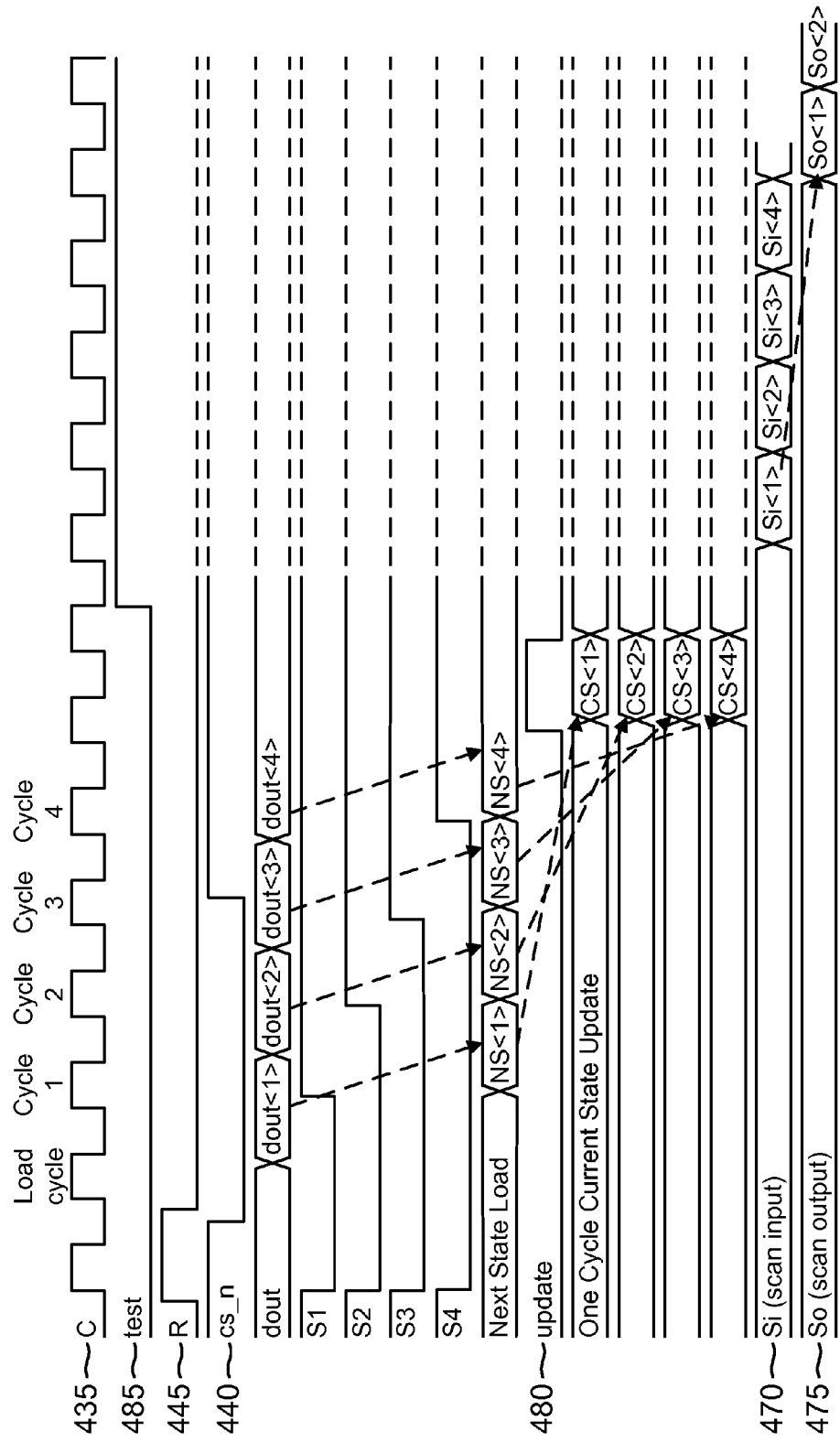
FIG. 4B is a timing diagram for the configuration, updating, and testing of the RICA of FIG. 4A.

A more detailed schematic of shift register 300 for the parallel configuration of an array of switch boxes is shown in FIG. 4A. In this embodiment, there are m broadcast sets, ranging from a zeroth broadcast set 400 to an mth broadcast set 405, where (m+1) is an integer representing the number of broadcast sets in this RICA embodiment. For illustration clarity, only four switch boxes are shown in broadcast set 400: a first switch box 410, a second switch box 415, a third switch box 420, and a fourth switch box 425. Each switch box has a next-state latch array (not illustrated) for storing the configuration word for its next state. The configuration words are all N bits wide, where N is some arbitrary positive integer. Thus, a configuration memory 430 is shown driving an N-bit wide configuration bus 220 to each broadcast set. FIG. 4B illustrates the timing of the various signals in FIG. 4A. Configuration memory 430 retrieves configuration words responsive to cycles of a RICA clock 435 when a chip select (CSN) signal 440 is asserted low. Prior to the retrieval of the configuration words, a reset signal 445 is asserted to reset shift register 300 and the latch arrays in the switch boxes. Each switch box has its clock input (E) driven by a corresponding flip-flop in shift register 300. Thus, shift register 300 includes a flip-flop for each row of switch boxes across the broadcast sets. In response to the assertion of reset signal 445, all the next-state latch arrays in the broadcast sets are opened from their default closed state.

To begin the parallel-loading process, an initial "dummy" flip-flop 446 responds to an initial load cycle of RICA clock 435 by registering a logical one. During this load cycle, configuration memory 430 retrieves the first set of configuration words responsive to an address signal 451. For broadcast set 400, the initial configuration word is denoted as dout<1>.

Each subsequent flip-flop in shift register 300 will then close the next-state latch arrays in its corresponding row of switch boxes because its strobe signal goes high as it latches the resulting latching word of all logical one values that is shifted through shift register 300 from dummy flip-flop 445. During a cycle 1 of RICA clock 435, all the next-state latch arrays in broadcast set 400 latch the dout<1> configuration word. An initial flip-flop 450 in shift register 300 will register the logical one value from dummy flip-flop 445 in cycle 1. A strobe signal S1 output from flip-flop 450 will thus go high responsive to RICA clock 435 cycling high in cycle 1. The next-state latch array in switch box 410 thus closes at this time as do all the other next-state latch arrays for the row including switch box 410. In the subsequent cycle 2 of RICA clock 435, the dout<2> configuration word is driven by configuration memory 430 into configuration bus 220 for broadcast set 400. But only the next-state latch arrays in switch boxes 415, 420, and 425 are open at this time along with all the other next-state latches in the corresponding rows including switch boxes 415, 420, and 425. During cycle 2, a flip-flop 455 latches the S1 output from flip-flop 450. Flip-flop 455 thus closes the next-state latch arrays in the row including switch box 415 at this time using strobe signal S2

In this fashion, the strobe (S) signal from each subsequent flip-flop goes high as the flip-flop latches the logical one values being shifted through shift register 300. For example, a flip-flop 460 asserts a strobe signal S3 during a cycle 3 of RICA clock 435. Similarly, a flip-flop 460 asserts a strobe signal S4 during a cycle 4 of RICA clock 435. In this fashion, each next-state latch array latches its corresponding configuration word despite the configuration words being broadcast in parallel to all the next-state latch arrays in a given broadcast set. The cycles of the RICA clock 435 may thus be denoted as cycles of a next-state (NS) load clock 490 as shown in FIG. 4B. In clock cycle NS<1>, the next-state latch array in switch box 410 latches dout<1> and closes. Similarly, in clock cycle NS<2>, the next-state latch array in switch box 415 latches dout<2> and closes, and so on. In that regard once a logical one has been latched in a given flip-flop in shift register 300, that flip-flop will latch logical ones in the subsequent RICA clock cycles as the all-ones latching word is fully shifted into shift register 300. In this fashion, once the latch arrays in a given row are closed, they will remain closed during the configuration process.

A scan-in signal 470 is used in test mode. This mode will be discussed further below. In addition, the shifting of the configuration words stored in the next-state latch arrays in broadcast set 400 into corresponding current-state latch arrays will also be discussed further below.

Note that it is arbitrary whether the latches are configured to be level-sensitive high or low with regard to being closed. Moreover, rather than making the default state for the latches being transparent, the default state may be closed in an alternative embodiment. In such an embodiment, an addressing circuit such as shift register 300 would be configured to open and then close the appropriate latch array when a given configuration word is driven into configuration bus 220. In that regard, an embodiment in which the default state is transparent for all the next-state latch arrays is advantageous in that the addressing circuit need merely close the corresponding latches in a given RICA clock cycle.

Figure 5:
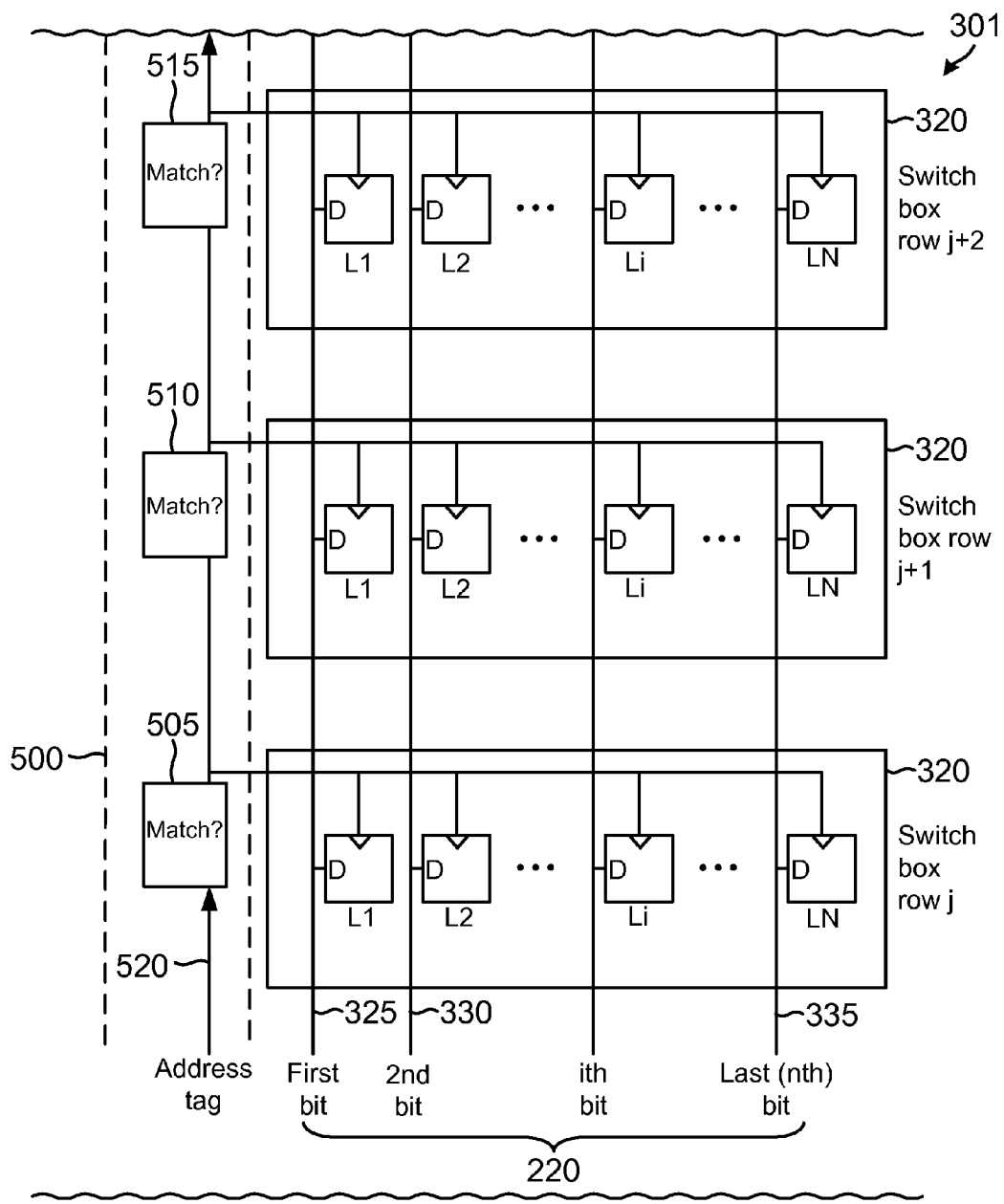
FIG. 5 is a high-level schematic for a plurality of latch arrays in a portion of a broadcast set, wherein the latch arrays are configured to be closed responsive to comparators comparing a tag address to a row address.

In yet another embodiment, each configuration word may be associated with an address tag. For example, the address tag may comprise a header for each configuration word. The resulting address tag may be common across each row of switch boxes. As shown in FIG. 5, an address circuit 500 may comprise comparators. Each switch box row would thus have its own comparator. For illustration clarity, just a portion of broadcast set 301 is shown in FIG. 5 as was done in FIG. 3. A comparator 505 controls the opening and closing of latch arrays 320 in the jth row of switch boxes. Similarly, a comparator 510 controls the opening and closing of latch arrays 320 in the (j+1)th row. Finally, a comparator 515 controls the opening and closing of latch arrays 320 in the (j+2)th row. When a given configuration word is retrieved from memory 201 or 205 and driven into configuration bus 220, the corresponding address tag is driven into an address tag bus 520 that couples to all the comparators. Each row has its own address. In any given clock cycle, the address tag for each configuration word will thus be the same from a given configuration memory. For example, referring again to array 200 of FIG. 2, the address tags for the configuration words from configuration memory 205 would all be the same in the Cycle 1 row. Each row thus needs just one comparator. A given row's comparator is configured to compare the address tag received on address tag bus 520 to its row address to determine whether a match is found. If the comparator finds a match, the comparator drives the clock inputs for the latches in its row accordingly. For example, in a default open embodiment, if the received address tag matches the jth row's address, comparator 505 would close all the latches in the jth row. Such a row addressing is quite advantageous: suppose the next state for array 200 is such that only one row has changed configuration words with respect to the current state. Whereas the shift register scheme of FIG. 3 would still requires 10 RICA clock cycles to update array 200, the comparators of FIG. 5 would require only one RICA clock cycle to complete the loading of the configuration data into the corresponding row.

Figure 6:
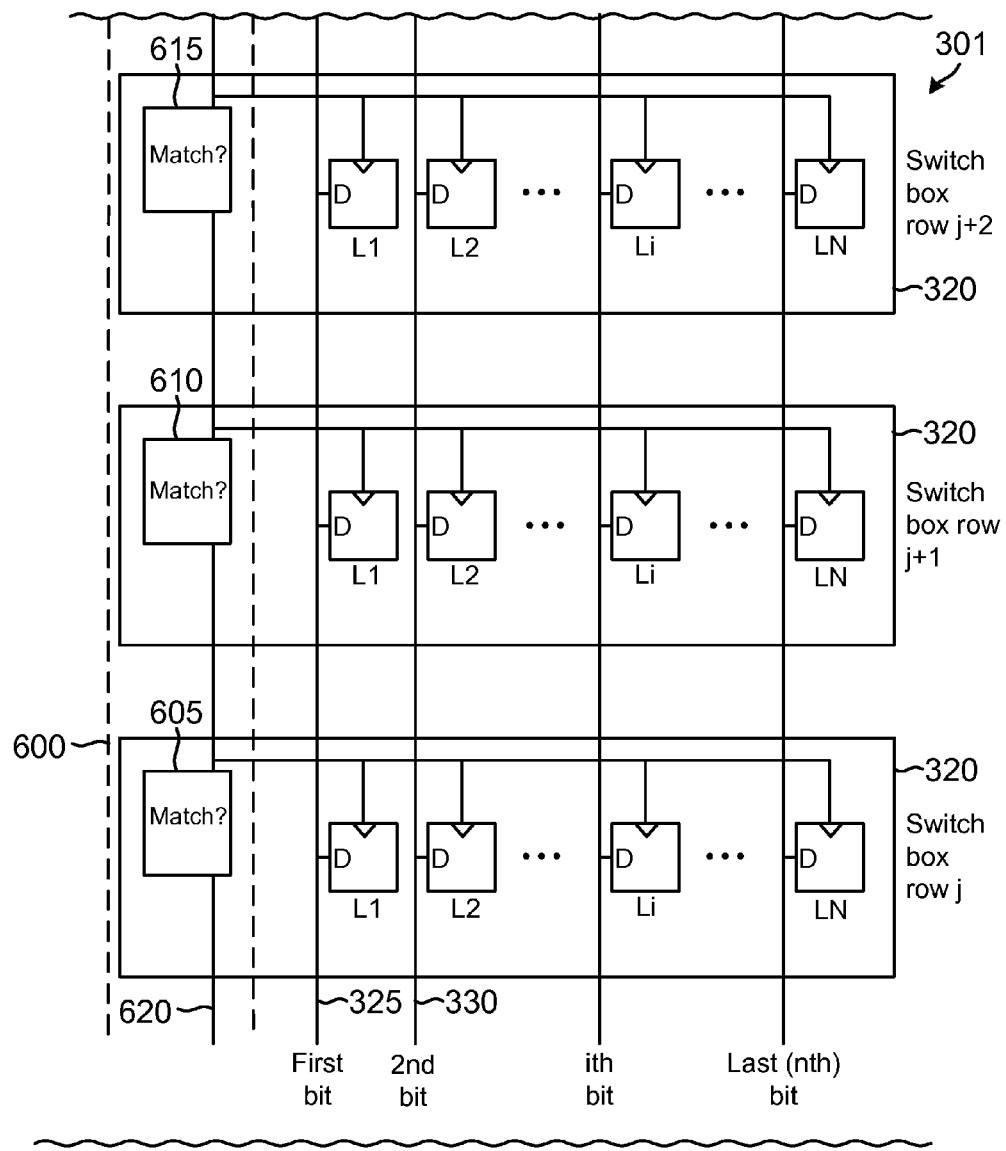
FIG. 6 is a high-level schematic for a plurality of latch arrays in a portion of a broadcast set, wherein the latch arrays are configured to be closed responsive to comparators comparing a tag address to a row and column address.

To provide even more granularity, each tag address may not only identify a particular row but also a column. In other words, a given tag address not only identifies a specific row, it would also identify a specific column. Thus, the address tags for the configuration word of a given row of switch boxes would not be the same in contrast to the FIG. 5 embodiment. Instead, each configuration word would have a unique tag address that identifies the corresponding row and column for the switch box to be configured. As shown in FIG. 6, an address circuit 600 may comprise comparators for each latch array 320. In other words, every switch box requires its own comparator in such a row-and-column addressable embodiment. For illustration clarity, just a portion of broadcast set 301 is shown in FIG. 6 as was done in FIG. 3. A comparator 605 controls the opening and closing for only latch array 320 in the jth row of this particular broadcast set 301 (corresponding to a particular column) Similarly, a comparator 610 controls the opening and closing for only latch array 320 in the (j+1)th row of this particular broadcast set 301. Finally, a comparator 615 controls the opening and closing for only latch array 320 in the (j+2)th row of this particular broadcast set 301. Each broadcast set 301 has its own tag address bus 620 that drives its comparators. Each latch array 320 has a unique address corresponding to its particular row and column. The corresponding comparator will close its latch array 320 if the tag array received on tag array bus 620 matches the row and column address for its latch array 320. In this fashion, a particular latch array 320 may be addressed as opposed to addressing an entire row of latch arrays 320.

Figure 7:
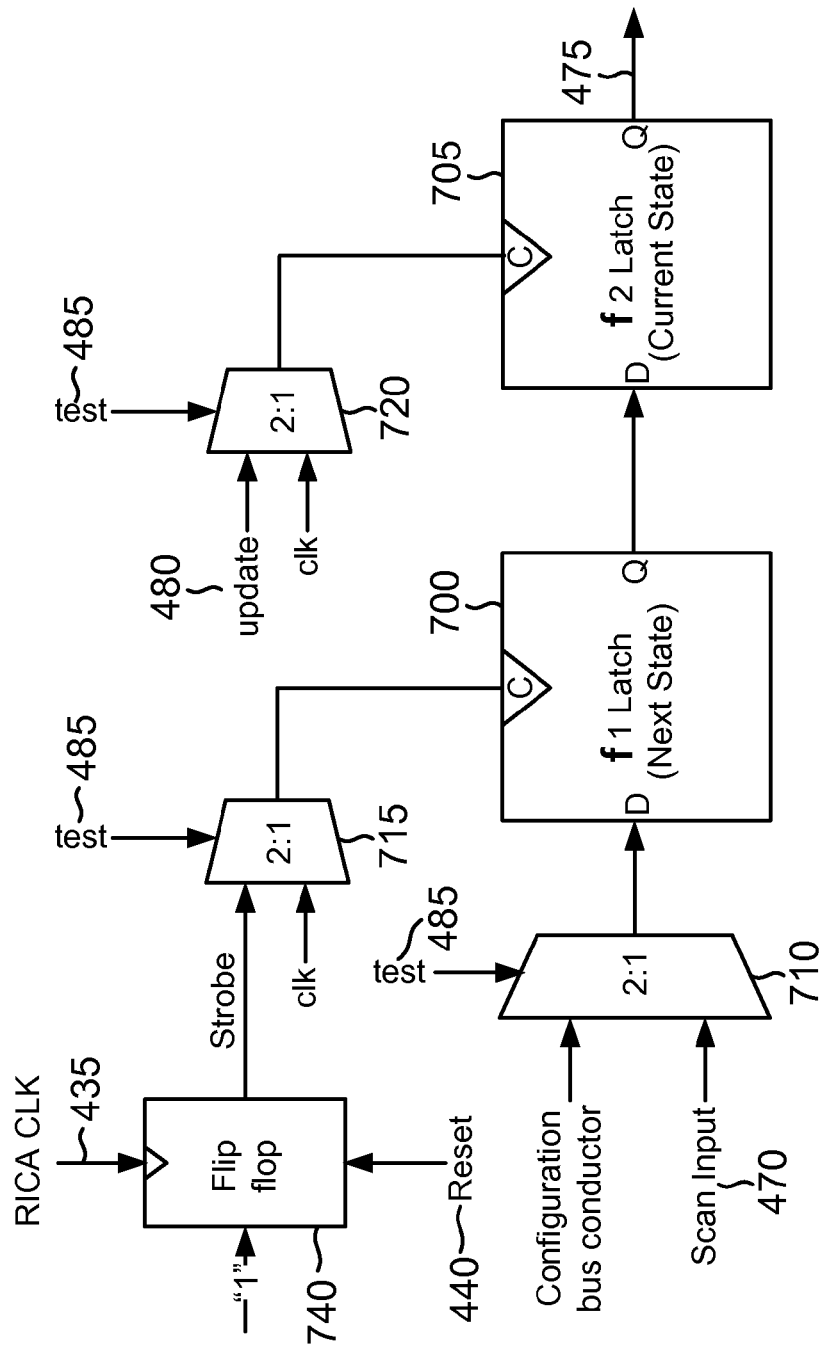
FIG. 7 is a high-level schematic for configuration bit's next-state latch and a corresponding current-state latch, wherein the latches are also configured for a scan mode.

As discussed above, the configuration words being loaded into the switch boxes may be next-state configuration words that are loaded into next-state latch arrays. Each next-state latch array would include the necessary number of next-state latches to store the configuration word for the next state. A corresponding current-state latch array would have the same number of current-state latches to store the configuration word for the current state. FIG. 7 illustrates an advantageous arrangement of a next-state latch 700 and a corresponding current-state latch 705 for a given configuration bit position. The configuration bit for next-state latch 700 is delivered on a configuration bit conductor as discussed with regard to FIGS. 3, 5, and 6. But to enable a scan chain for testing the latch arrays, a scan-in multiplexer 710 is configured to select between the configuration bit carried on the configuration bit conductor and a scan-in (si) signal 470 responsive to a test signal 485. In a test mode, test signal 485 is asserted as shown in FIG. 4B such that scan-in multiplexer 710 selects for scan-in signal 470 and delivers this signal to the data input of next-state latch 700. During normal operation, test signal 485 is de-asserted such that the scan-in multiplexer 710 selects for the configuration bit so that it may be latched by next-state latch 700.

As discussed with regard to FIGS. 4A and 4B, shift register 300 includes a flip-flop for each row of switch boxes. In FIG. 7, a flip-flop 740 is the flip-flop that controls whether next-state latch 700 is open or closed. A next-state multiplexer 715 is responsive to test signal 485 so as to select between the strobe signal from flip-flop 740 or a scan clock (clk) to drive the clock input for next-state latch 700. Similarly, a current-state multiplexer 720 is controlled by test signal 485 to select between an update signal 480 and the scan clock (clk). During normal operation, test signal 485 is de-asserted such that current-state multiplexer 720 selects for the update signal 480. Referring again to FIGS. 4A and 4B, when the broadcast sets such as broadcast set 400 have latched their next-state configuration words (after completion of clock cycle NS<4>), update signal 480 may be asserted. In just a single cycle of RICA clock 435, all the current-state latch arrays can latch the next-state configuration words from the corresponding next-state latch arrays. This RICA clock cycle is labeled in FIG. 4B as CS<1> for switch box 410, CS<2> for switch box 415, CS<3 for switch box 420, and CS<4> for switch box 425. This is quite advantageous in that a RICA may be configured in parallel during the execution of a given instruction as determined by the current-state configuration words. When it is time to load a new instruction corresponding to the next-state configuration words, the RICA need pause operation for just a single RICA clock cycle, whereupon it is re-configured and ready to resume operation. In contrast, other reconfigurable architectures such as an FPGA are much slower in comparison.

Next-state latch 700 and current-state latch 705 are level sensitive to complementary clock states as represented by φ2 and φ1 designations, respectively. Thus, when test signal 485 is asserted, these latches form an edge-triggered flip-flop in a scan chain for scanning the current-state and next-state latch arrays. Scan in signal 470 is thus shifted through the current-state and next-state latch arrays in broadcast set 400 as scan out signal 475.

Figure 8:
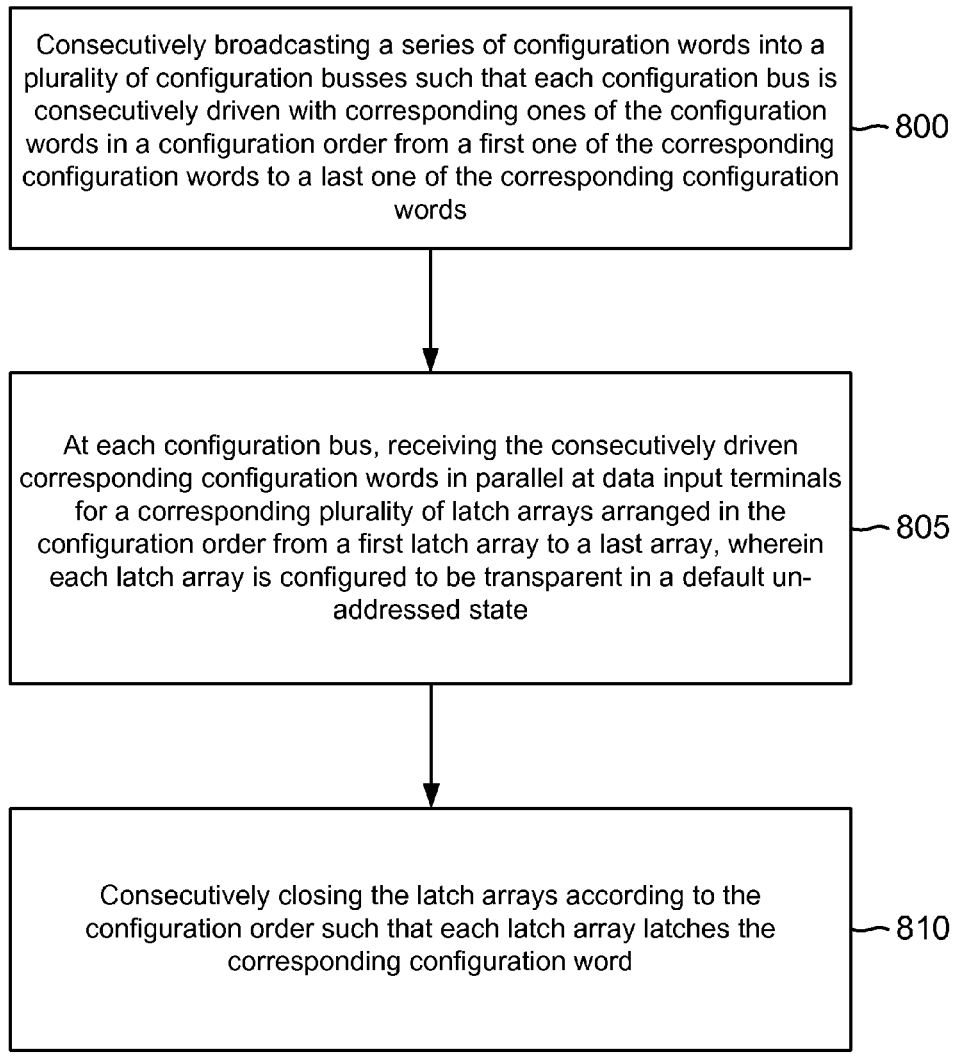
FIG. 8 is a flowchart for a method of broadcasting configuration words in parallel into a switch box array.

A flowchart for an example method of broadcasting configuration words in parallel to a broadcast set of latch arrays for a reconfigurable instruction cell array is shown in FIG. 8. In a step 800, a series of configuration words are consecutively broadcast into a plurality of configuration busses such that each configuration bus is consecutively driven with corresponding ones of the configuration words in a configuration order from a first one of the corresponding configuration words to a last one of the corresponding configuration words. In array 200, the configuration order corresponds to the clock cycle driving shift register 300. For example, switch box 215 is the first switch box in the corresponding broadcast set. Its corresponding configuration word is thus the first configuration word driven into the broadcast set's configuration bus responsive to the first cycle of the RICA clock. Thus, the row that contains switch box 215 is denoted as the Cycle-1 row. Similarly, switch box 210 is the last switch box in this broadcast set. Its corresponding configuration word is thus the last configuration word driven into the broadcast set's configuration bus responsive to the tenth cycle of the RICA clock. In that regard, the row containing switch box 210 is denoted as the Cycle-10 row. The switch boxes in each broadcast set may be considered to be arranged in the same configuration order as used to drive the configuration words consecutively onto the broadcast set's configuration bus.

In a step 805, the consecutively-driven corresponding configuration words in each configuration bus are received in parallel at data input terminals for a corresponding plurality of latch arrays arranged in the configuration order from a first latch array to a last latch array. In this embodiment, the latch arrays are configured to be open in a default, unaddressed state. Finally, in a step 810, the latch arrays are consecutively closed according to the configuration order such that each latch array latches the corresponding configuration word.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A reconfigurable instruction cell array (RICA), comprising:
    an array of switch boxes organized into broadcast sets of switch boxes, each switch box including a programmable instruction cell and switch fabric configurable according to a corresponding configuration word, each switch box including a latch array configured to store the corresponding configuration word, wherein each configuration word comprises a plurality of configuration bits and each latch array comprises a plurality of latches corresponding to the plurality of configuration bits;
    a plurality of configuration busses corresponding to the plurality of broadcast sets, each configuration bus comprising a plurality of configuration bit conductors corresponding to the plurality of configuration bits, each configuration bit conductor configured to conduct the corresponding configuration bit, wherein for each broadcast set, the corresponding bit conductor for each configuration bit couples to a data input terminal for the corresponding latch in each latch array for the broadcast set; and
    an addressing circuit configured to selectively address the latch arrays such that each latch array latches its corresponding configuration word from the corresponding configuration bus.

2. The RICA of claim 1, wherein the latches in the latch arrays are configured to be transparent in a default state and to close responsive to being addressed by the address circuit.

3. The RICA of claim 1, wherein the switch boxes are arranged into rows and columns, and wherein the addressing circuit is configured to selectively address the latch arrays for each row of switch boxes.

4. The RICA of claim 3, wherein the address circuit comprises a shift register.

5. The RICA of claim 4, wherein the shift register is configured to be reset in a default state and to consecutively shift a latching word responsive to cycles of a RICA clock to consecutively close rows of the latch arrays.

6. The RICA of claim 1, wherein the switch boxes are arranged into rows and columns, and wherein a first plurality of the broadcast sets each comprises an upper half of each column and wherein a second plurality of the broadcast sets each comprises a lower half of each column.

7. The RICA of claim 6, further comprising:
    a first memory for storing the configuration words for the first plurality of the broadcast sets; and
    a second memory for storing the configuration words for the second plurality of the broadcast sets.

8. The RICA of claim 7, wherein the first and second memory are controlled to drive the configuration words into the corresponding bus conductors responsive to cycles of a RICA clock.

9. The RICA of claim 1, wherein the latches are each configured to be closed in a default state and to cycle open and then close again in response to being addressed by the address circuit.

10. The RICA of claim 6, wherein each configuration word is associated with a tag address identifying a row for the corresponding latch array, and wherein the first memory is controlled such that the configuration words at any given time driving the configuration busses for the first plurality of broadcast sets all have the same tag address and wherein the second memory is controlled such that the configuration words at any given time driving the configuration busses for the second plurality of broadcast sets all have the same tag address, and wherein the address circuit comprises a plurality of comparators corresponding to the plurality of rows, each comparator configured to compare a received tag address with an address for the corresponding row.

11. A method, comprising;
    consecutively broadcasting a series of configuration words into a plurality of configuration busses such that each configuration bus is consecutively driven with corresponding ones of the configuration words in a configuration order from a first one of the corresponding configuration words to a last one of the corresponding configuration words;
    at each configuration bus, receiving the consecutively-driven corresponding configuration words in parallel at data input terminals for a corresponding plurality of latch arrays arranged in the configuration order from a first latch array to a last latch array, wherein each latch array is configured to be transparent in a default un-addressed state; and
    consecutively closing the latch arrays according to the configuration order such that each latch array latches a corresponding configuration word.

12. The method of claim 11, wherein each latch array is included in a corresponding switch box having an instruction cell and a switching fabric, the method further comprising configuring each switch box's instruction cell and switching fabric responsive to the configuration word latched in the switch box's latch array.

13. The method of claim 12, wherein the configuration words are next-state configuration words and the latch arrays are next-state latch arrays, and wherein configuring each switch box comprises latching the next-state configuration words stored in the next-state latch arrays into corresponding current-state latch arrays.

14. The method of claim 11, wherein consecutively closing the latches is responsive to a latching word being shifted into a shift register.

15. The method of claim 14, wherein shifting the latching word through the shift register occurs responsive to a clock such that after the latching word is fully shifted into the shift register, the latch arrays are all closed.

16. The method of claim 11, wherein consecutively closing the latch arrays occurs responsive to a comparison of a tag address associated with each configuration word.

17. The method of claim 16, wherein the tag address identifies a row of latch arrays.

18. The method of claim 16, wherein the tag address identifies a latch array at a row and column address.

19. A reconfigurable instruction cell array (RICA), comprising:
an array of switch boxes organized into broadcast sets of switch boxes, each switch box including a programmable instruction cell and switch fabric configurable according to a corresponding configuration word, each switch box including a latch array configured to store the corresponding configuration word, wherein each configuration word comprises a plurality of configuration bits and each latch array comprises a plurality of latches corresponding to the plurality of configuration bits; and
means for broadcasting configuration words into each broadcast set such the input data terminals for the latch arrays in the broadcast set terminal receive the broadcasted configuration words in parallel; and
means for addressing the latch arrays in each broadcast set to selective latch the broadcasted configuration words.

20. The RICA of claim 19, wherein the means for addressing the latch arrays in each broadcast set comprises a shift register.

* * * * *